United States Patent [19]

Kubo et al.

[11] 4,437,358

[45] Mar. 20, 1984

[54] TRANSMISSION WITH TORQUE CONVERTER AND LOCK UP CLUTCH WITH LUBRICATION AND PRESSURIZATION SYSTEM

[75] Inventors: Seitoku Kubo, Toyota; Koujiro Kuramochi, Okazaki; Tatsuo Kyushima, Toyota, all of Japan

[73] Assignee: Toyota Jidosha Kabushiki Kaisha, Toyota, Japan

[21] Appl. No.: 278,351

[22] Filed: Jun. 29, 1981

[30] Foreign Application Priority Data

Jul. 4, 1980 [JP] Japan ............................. 55-91379

[51] Int. Cl.³ .......................................... B60K 41/02
[52] U.S. Cl. ...................................... 74/867; 74/868; 74/869
[58] Field of Search ............... 74/856, 861, 865, 867, 74/868, 869

[56] References Cited

U.S. PATENT DOCUMENTS

| | | | |
|---|---|---|---|
| 3,000,233 | 9/1961 | Roche | 74/865 |
| 3,497,043 | 2/1970 | Leonard | 192/0.092 |
| 3,541,893 | 11/1970 | Dyke et al. | 74/868 |
| 3,874,254 | 4/1975 | Ahlen | 74/869 |
| 4,346,626 | 8/1982 | Kawamoto | 74/856 |
| 4,349,088 | 9/1982 | Ito et al. | 74/869 |

FOREIGN PATENT DOCUMENTS

| | | | |
|---|---|---|---|
| 52-21567 | 2/1977 | Japan | 74/869 |
| 2017842 | 10/1979 | United Kingdom | 74/869 |
| 2032016 | 4/1980 | United Kingdom | 74/867 |

*Primary Examiner*—Leslie A. Braun
*Assistant Examiner*—Joseph M. Rolnicki
*Attorney, Agent, or Firm*—Stevens, Davis, Miller & Mosher

[57] ABSTRACT

An automatic transmission includes: a gear transmission mechanism which can provide several speed stages according to selective supply of hydraulic pressures from a control system; a hydraulic fluid pump; a torque converter incorporating a lock up clutch which is selectively engaged or disengaged according to selective supply of pressure; a line fluid pressure control valve which receives a supply of pressurized hydraulic fluid from the pump and which provides a supply thereof, regulated to a line pressure level, to the control system; and a torque converter fluid pressure control valve which receives a supply of pressurized hydraulic fluid from the pump, and which provides a supply thereof to the torque converter as a source of torque converter pressure for filling it with hydraulic fluid and for selectively either engaging or disengaging the lock up clutch, this supply of torque converter pressure being regulated to a proper level by the torque converter fluid pressure control valve, when the supply of hydraulic fluid from the hydraulic fluid pump is plentiful, diverting therefrom an overflow flow of hydraulic fluid, which, when available, is supplied to the lubricating system of the gear transmission mechanism, to which the torque converter hydraulic fluid pressure is also always supplied via a throttle element.

2 Claims, 1 Drawing Figure

TRANSMISSION WITH TORQUE CONVERTER AND LOCK UP CLUTCH WITH LUBRICATION AND PRESSURIZATION SYSTEM

BACKGROUND OF THE INVENTION

The present invention relates to the field of automatic transmissions, and, more particularly, relates to the field of automatic transmissions with torque converters which are equipped with lock up clutches.

Various automatic transmissions for automotive vehicles are known in various forms. Such an automatic transmission conventionally includes a gear transmission mechanism which provides a plurality of speed stages and which is set to its various speed stages by selective supply of actuating hydraulic fluid pressures to various friction engaging mechanisms comprised within the gear transmission mechanism such as multi plate clutches and multi plate brakes, said selective supply of actuating fluid pressures being provided from a hydraulic fluid pressure control system, of which many forms are well known. Such a hydraulic fluid pressure control system typically requires a supply of line pressure for operation, and typically receives this line pressure from a hydraulic fluid pump by way of a line pressure regulation valve which modifies the output fluid pressure produced by the pump by releasing a part of it through a release port. And it is typical for such a hydraulic fluid pump to be rotated at a rotational speed proportional to the rotational speed of the power input shaft of the transmission, i.e. at a rotational speed at least approximately proportionally related to the rotational speed of the crankshaft of the internal combustion engine which powers the vehicle.

Further, such an automatic transmission conventionally includes a fluid torque converter, which provides a fluid coupling between an engine of the vehicle and the gear transmission mechanism, thus eliminating the need for any clutch system for the vehicle, and allowing for the vehicle to be stationary while the engine is turning at a low rotational speed at or close to the idling speed, as well as providing torque multiplication by fluid flow, in a per se well known way, when the vehicle is being accelerated at relatively low speed and relatively low engine rotational speed. Many such torque converters are of course presently well known. Generally, such a torque converter comprises: a housing of a generally toroidal shape, on the inside of which there are formed a series of vanes which constitute a pump impeller, and fixed to a power input shaft; a pump turbine member mounted within the housing as fixed to a power output shaft; and a stator member mounted within the housing via a one way brake on a fixed member. The housing of such a torque converter is kept filled with hydraulic fluid, which is pumped thereinto and is also drained therefrom, and in a per se well known way the pump impeller, the stator member, and the turbine member cooperate, when the housing of the torque converter is thus filled with hydraulic fluid, to define a toroidal hydraulic fluid flow circulation system, which is adapted to transfer torque in a conventional fashion between the pump impeller and the turbine member.

This supply of hydraulic fluid for filling the torque converter is typically provided to the inside of the housing thereof along or beside the central rotational axis thereof via a hole in one of the shafts passing therealong, or between two concentric ones of such shafts, and the draining of hydraulic fluid from the torque converter is also typically performed in a similar manner. The supply of hydraulic fluid is provided, generally in the prior art, from a torque converter pressure regulation valve, which, in a fashion similar to the line pressure regulation valve mentioned above, modifies the release fluid pressure discharged from the release port of the line pressure regulation valve by releasing a part of it back to a hydraulic fluid reservoir, and which supplies a torque converter pressure to the torque converter. Further, it has become more and more common nowadays for a torque converter to be provided with a lock up clutch, which is a mechanical clutch which when actuated mechanically couples together the pump impeller and the pump turbine member of the torque converter with regard to their rotation, so that the above mentioned hydraulic torque transmission between the pump impeller and the pump turbine no longer occurs. Such a lock up clutch is engaged, typically, when the vehicle incorporating the torque converter is being driven at high road speed with the gear transmission mechanism in a high gear speed stage, and with the internal combustion engine of the vehicle operating at fairly high rotational speed, in which circumstances the hydraulic torque conversion function of the torque converter is not in fact particularly required; and the provision of such a lock up clutch is effective for increasing fuel economy of the vehicle, especially when running on the open road such as an expressway. It is well known and conventional for such a lock up clutch to be engaged or disengaged according to the directions of supply and draining of the torque converter pressure to and from the interior of the housing of the torque converter. In other words, when the torque converter pressure is being supplied to one aperture which leads to the interior of the torque converter housing, and is being drained from another aperture, then the lock up clutch is engaged; and when the torque converter pressure is being supplied to said other aperture, and is being drained from said one aperture, then the lock up clutch is disengaged. Thus the supply of torque converter hydraulic fluid pressure to the torque converter from the torque converter pressure regulation valve is used for two purposes: to fill the torque converter with hydraulic fluid, and to selectively engage and disengage the lock up clutch, according to the direction of said supply.

Meanwhile, the above mentioned gear transmission mechanism of the automatic transmission of course requires lubrication, which typically is performed by supply of the same hydraulic fluid as is used for the hydraulic operation of the torque converter and of the hydraulic fluid pressure control system, and this supply of lubricating hydraulic fluid to the gear transmission mechanism is conventionally made by diverting part of the supply of the torque converter hydraulic fluid pressure which is being supplied to the torque converter and to the lock up clutch from the torque converter pressure regulation valve.

Further, heat tends to be generated within the torque converter when the torque converter is performing its function of fluid torque conversion, i.e. when the lock up clutch is not engaged, in quite a large amount, due to the churning of hydraulic fluid therein between the vanes formed on the pump impeller, the stator, and the pump turbine member, and due to frictional losses in the torque converter, and accordingly it is usual for a hydraulic fluid cooler to be provided, through which the flow of hydraulic fluid which has passed through the torque converter is conducted, in order to keep the rise in temperature of the hydraulic fluid within the transmission to within a reasonable and acceptable level.

However, in the prior art, difficulties have arisen with regard to the proper disengagement of the lock up clutch, when as described above the torque converter pressure is being supplied to the torque converter and to the lock up clutch from the torque converter pressure regulation valve which modifies the fluid pressure discharged from the line pressure regulation valve. In detail, when the internal combustion engine of the vehicle incorporating the transmission is operating at fairly high rotational speed, and accordingly the hydraulic fluid pump of the transmission, as described above, is rotating at a fairly high rotational speed and accordingly is providing fairly high delivery rate of pressurized hydraulic fluid, then no problem tends to arise; but, when the internal combustion engine of the vehicle incorporating the transmission is operating at a low rotational speed, and accordingly the hydraulic fluid pump, as described above, is rotating at a fairly low rotational speed and accordingly is providing a fairly low delivery rate of pressurized hydraulic fluid, then the release rate from the line pressure regulation valve may prove inadequate for providing a source of hydraulic fluid pressure to be regulated by the torque converter pressure regulation valve for performing the functions of providing a supply of lubricating hydraulic fluid to the gear transmission mechanism and also providing a flow of hydraulic fluid through the torque converter in the appropriate direction for disengaging the lock up clutch and through the hydraulic fluid cooler for cooling the hydraulic fluid contained within the transmission.

In these circumstances, typically no problem arises with regard to lubrication of the gear transmission mechanism, because when the internal combustion engine of the vehicle incorporating the transmission is operating at a low rotational speed then in general the moving parts of the gear transmission are also operating at low rotational speeds and under low force loadings, and hence these moving parts do not require supply of a particularly large amount of lubricating hydraulic fluid. Similarly, no problem typically arises in the above defined circumstances with regard to cooling of the hydraulic fluid within the transmission, because when the internal combustion engine of the vehicle incorporating the transmission is operating at a low rotational speed then in general no very great amount of heat is being generated within the torque converter by the churning of hydraulic fluid therein, even though the lock up clutch is disengaged. However, a problem has arisen in the prior art with regard to the proper disengagement of the lock up clutch, and when as has often been the case the supply of flow of hydraulic fluid through the torque converter, performed from the torque converter pressure regulation valve, has been insufficient fully to disengage the lock up clutch, dragging, chattering, and improper release of the lock up clutch have tended to occur, which have deteriorated the drivability of the vehicle incorporating the transmission, as well as causing poor durability of the lock up clutch.

SUMMARY OF THE INVENTION

Accordingly, it is the primary object of the present invention to provide an automatic transmission incorporating a lock up clutch, in which full and proper disengagement of the lock up clutch is assured at all times that such disengagement is required.

It is a further object of the present invention to provide an automatic transmission incorporating a lock up clutch, in which dragging of the lock up clutch is effectively avoided.

It is a further object of the present invention to provide an automatic transmission incorporating a lock up clutch, in which chattering of the lock up clutch is prevented.

It is a further object of the present invention to provide an automatic transmission incorporating a lock up clutch, in which the lock up clutch has good durability.

It is a further object of the present invention to provide an automatic transmission incorporating a lock up clutch, in which the above objects are accomplished, without substantially deteriorating the effectiveness of lubrication of the components of a gear transmission mechanism incorporated in the transmission.

It is a further object of the present invention to provide an automatic transmission incorporating a lock up clutch, in which, when the hydraulic fluid pump of the transmission is rotating at not very high rotational speed, and the lock up clutch is to be disengaged, the primary use made of the delivery of torque converter fluid pressure from such a torque converter pressure regulation valve as detailed above is disengagement of the lock up clutch, and lubrication of the components of a gear transmission mechanism incorporated in the transmission is economized upon.

It is a yet further object of the present invention to provide an automatic transmission incorporating a lock up clutch, in which the above objects are accomplished, without substantially deteriorating the effectiveness of cooling of the hydraulic fluid contained in the transmission.

It is a yet further object of the present invention to provide an automatic transmission incorporating a lock up clutch, in which, when the hydraulic fluid pump of the transmission is rotating at not very high rotational speed, and the lock up clutch is to be disengaged, the primary use made of the delivery torque converter fluid pressure from such a torque converter pressure regulation valve as detailed above is disengagement of the lock up clutch, and cooling of the hydraulic fluid contained in the transmission is economized upon.

It is a yet further object of the present invention to provide an automatic transmission incorporating a lock up clutch, in which supply of a certain amount of lubricating hydraulic fluid to the components of a gear transmission mechanism incorporated in the transmission is guaranteed at all times.

According to the present invention, these and other objects are accomplished by an automatic transmission for an automotive vehicle, comprising: (a) a gear transmission mechanism which comprises a lubricating system and which can provide a plurality of speed stages according to selective supply of actuating hydraulic fluid pressure thereto; (b) a hydraulic fluid pump which provides a supply of pressurized hydraulic fluid; (c) a torque converter, the interior of which is filled with hydraulic fluid, and which incorporates a lock up clutch which may be selectively engaged or disengaged according to selective supply of hydraulic fluid pressure thereto: (d) a hydraulic fluid pressure control system which controls said gear transmission mechanism so as, according to operational parameters of said vehicle, to set said gear transmission mechanism to one or another of said plurality of speed stages; (e) a line hydraulic fluid pressure control valve which receives a supply of pressurized hydraulic fluid from said hydraulic fluid pump and which provides a supply thereof, regulated to a line hydraulic fluid pressure level, to said hydraulic fluid pressure control system as a source of line pressure; (f) a torque converter hydraulic fluid pressure control valve which: (f1) receives a supply of pressurized hydraulic fluid from said hydraulic fluid pump; and (f2) provides a supply thereof to said torque converter as a source of torque converter hydraulic fluid pressure for filling the interior of said torque converter with hydraulic fluid and for selectively either engaging or disengaging said lock up clutch, said supply of torque converter hydraulic fluid pressure being regulated to a torque converter hydraulic fluid pressure level by said torque converter hydraulic fluid pressure control valve performing the action of, when said supply thereto of hydraulic fluid from said hydraulic fluid pump is plentiful, diverting therefrom a release flow of hydraulic fluid; and (g) a throttle element: (h) said release flow of hydraulic fluid, when available, being supplied to said lubricating system of said gear transmission mechanism, and also said torque converter hydraulic fluid pressure being supplied to said lubricating system of said gear transmission mechanism via said throttle element.

According to such a structure, when said hydraulic fluid pump is producing a considerably plentiful amount of flow of hydraulic fluid, and said torque converter hydraulic fluid pressure control valve is thus releasing a fairly large release flow of hydraulic fluid as diverted from said plentiful supply of hydraulic fluid from said pump, said lubricating system of said gear transmission mechanism is thus receiving an ample flow of lubricating hydraulic fluid, this ample flow being made up both of said release flow of hydraulic fluid, and also of said flow of hydraulic fluid from said torque converter hydraulic fluid pressure as provided through said throttle element; but, when said hydraulic fluid pump is producing a rather small flow of hydraulic fluid, and said torque converter hydraulic fluid pressure control valve is not releasing any substantial release flow of hydraulic fluid as diverted from said supply of hydraulic fluid from said pump, said lubricating system of said gear transmission mechanism is still receiving a certain definite small amount of lubricating hydraulic fluid, from said torque converter hydraulic fluid pressure as provided via said throttle element.

Further, according to a particular aspect of the present invention, these and other objects are more particularly and concretely accomplished by such a transmission as described above, further comprising a hydraulic fluid cooler, wherein said hydraulic fluid cooler is provided with a flow of hydraulic fluid which is being discharged from said torque converter.

According to such a structure, if said lock up clutch is disengaged, the hydraulic fluid which is being discharged from said torque converter, which has been warmed by churning within said torque converter as said torque converter performs its torque conversion function with said lock up clutch disengaged, is cooled by said hydraulic fluid cooler; and, if said lock up clutch is engaged, since no particular churning of hydraulic fluid is occurring within said torque converter, no cooling function is performed, nor need be performed, by said hydraulic fluid cooler for the hydraulic fluid which is being discharged from said torque converter.

BRIEF DESCRIPTION OF THE DRAWING

The present invention will now be shown and described with reference to a preferred embodiment thereof, and with reference to the illustrative drawing. It should be clearly understood, however, that the description of the embodiment, and the drawing, are both given purely for the purposes of explanation and exemplification only, and are not intended to be limitative of the scope of the present invention in any way, since the scope of the present invention is to be defined solely by the legitimate and proper scope of the appended claims. In the drawing, the sole FIGURE thereof is a schematic part block diagrammatical part sectional view, showing said preferred embodiment of the transmission according to the present invention, with parts thereof which are per se well known in the art and conventional shown as blocks or as diagrammatic line drawings for the convenience of description, and with certain valves shown by longitudinal cross sectional views.

DESCRIPTION OF THE PREFERRED EMBODIMENT

Figure 1:
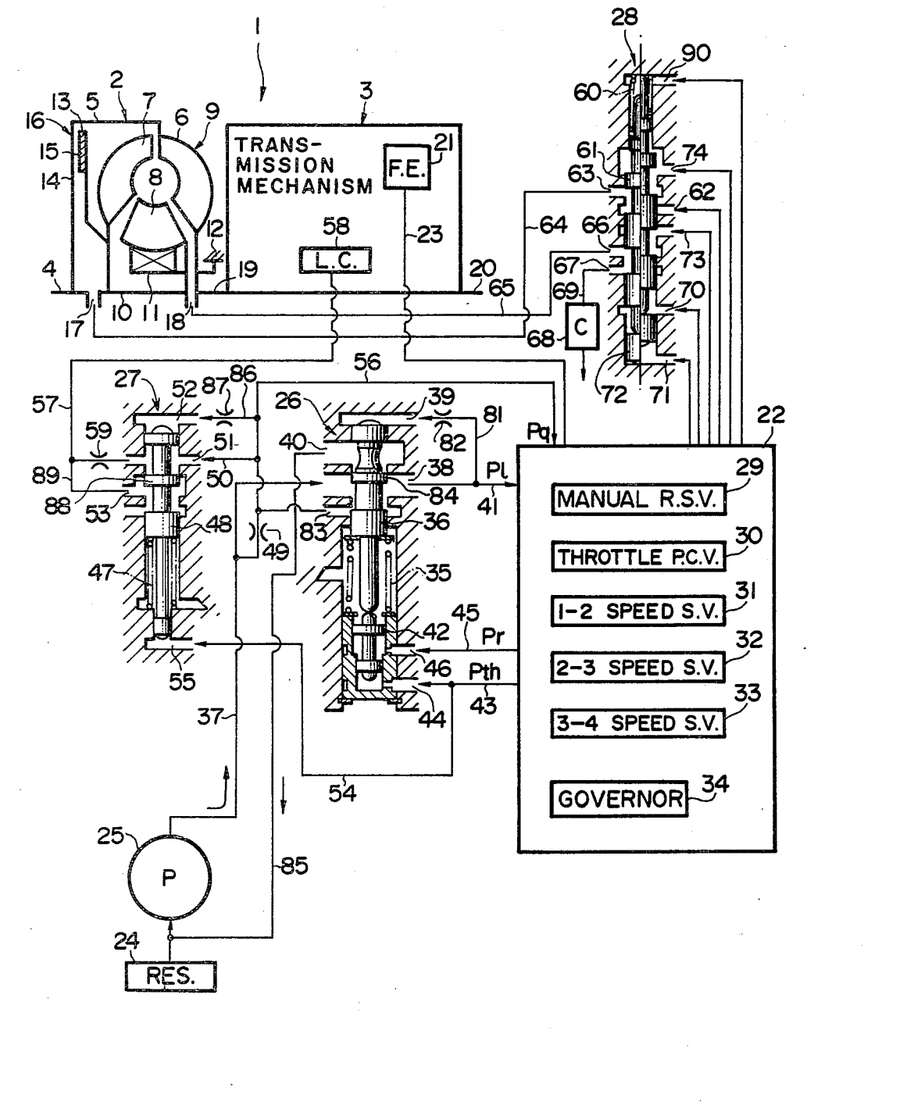

The present invention will now be described with reference to a preferred embodiment thereof, and with reference to the appended drawing, the sole FIGURE of which is a schematic view of an automatic transmission according to the present invention. In the FIGURE, the reference numeral 1 generally denotes an automatic transmission, which comprises a torque converter assembly 2, a gear transmission mechanism 3, and a hydraulic fluid pressure control system.

The torque converter assembly 2 comprises a torque converter 9 and a lock up clutch assembly, generally designated by reference numeral 16. A rotational power input shaft 4 receives supply of input rotational power from the crankshaft of an internal combustion engine of the vehicle to which the transmission 1 is fitted, neither the engine nor the crankshaft being shown in the FIGURE, and this power input shaft 4 is rotationally coupled to a housing 5 of the torque converter 9, which rotates integrally with the power input shaft 4, and which has an end wall 14. A pump impeller 6 formed with vanes thereon is rotationally coupled to a part on the right in the FIGURE of the inside of the torque converter housing 5. Coaxial with the power input shaft 4 there is provided a power output shaft 10 of the torque converter assembly 2, and this power output shaft 10 is rotationally coupled to a turbine member with vanes formed thereon, designated by the reference numeral 7. A stator member 8 with vanes formed thereon is mounted, via a one way brake 11, to a fixed member 12 of the torque converter assembly 2, so as to be rotatable with respect thereto in one preferred rotational direction only. In a per se conventional way, the pump impeller 6, the stator member 8, and the turbine member 7 cooperate, when the housing 5 of the torque converter assembly 2 is filled with hydraulic fluid, to define a toroidal hydraulic fluid flow circulation system, which is adapted to transfer torque in a conventional fashion between the pump impeller 6 and the turbine member 7.

The torque converter assembly 2 is provided with a lock up clutch assembly 16 of a per se well known sort, which will now be explained. To the power output shaft 10 there is coaxially fixedly coupled a clutch disk 13, on the left hand side of which in the FIGURE, i.e. on the side closest to the end wall 14 of the torque converter housing 5, there is fixed a lining 15 made of a material adapted to frictionally engage against said end wall 14 of the torque converter housing 5. Accordingly, in combination with said end wall 14, said clutch disk 13 constitutes a lock up clutch assembly 16, which, when said clutch disk 13 is impelled towards said end wall 14, in a manner which will be explained hereinafter, rotationally engages said clutch disk 13 to said torque converter housing 5, i.e. rotationally engages together said power input shaft 4 and said power output shaft 10.

The lock up clutch assembly 16 is engaged and disengaged by the direction of supply of actuating hydraulic fluid pressure thereto, as will now be explained. Two hydraulic fluid apertures, a first hydraulic fluid aperture 17 and a second hydraulic fluid aperture 18, are provided for conducting hydraulic fluid into and out of the inside of the torque converter housing 5, at the part of the torque converter housing 5 near the axis thereof. In fact, these apertures 17 and 18 are only schematically shown in the drawing; the practical form of construction therefor, as is per se well known in the art, is for these apertures to open to the inner space within the torque converter housing 5 from within central openings of shafts which extend along the axis of the torque converter 9, for instance from within a central axial hole through the power output shaft 10 of the torque converter 9. The first hydraulic fluid aperture 17 opens to the part of the space within the torque converter housing 5 which lies between the end wall 14 of the torque converter housing and the clutch disk 13, and the second hydraulic fluid aperture 18 opens to the part of the space within the torque converter housing 5 which lies to the right of the clutch disk 13 in the FIGURE.

Accordingly, when a flow of hydraulic fluid is supplied into the interior of the torque converter housing 5 in through the first hydraulic fluid aperture 17, and is taken out of the interior of the torque converter housing 5 from the second hydraulic fluid aperture 18, this flow of hydraulic fluid of course serving to fill the inside of the torque converter housing 5 with hydraulic fluid as is required for its operation, then the excess of the fluid pressure on the left side in the FIGURE of the clutch disk 13 over the fluid pressure on the right side thereof, due to the rather restricted size of the space available for passage of hydraulic fluid past the lining 15, between said lining 15 and the end wall 14 of the torque converter housing 5, ensures that the clutch disk 13 as a whole is biased to the right in the FIGURE, and does not substantially touch the end wall 14 of the torque converter housing 5, via the lining 15. In this operational state, the clutch disk 13 and the torque converter housing 5 are not substantially mechanically coupled together, and accordingly the pump impeller 6 and the turbine member 7 of the torque converter 9 are not mechanically coupled together with regard to their rotation, but instead are only rotationally coupled together via the circulation of hydraulic fluid within the torque converter 9, i.e. are only rotationally coupled together in a torque converting fashion, according to the normal per se well known functioning of the torque converter 9. In other words, the lock up clutch assembly 16 is disengaged, by the supply of hydraulic fluid into the interior of the torque converter housing 5 in through the first hydraulic fluid aperture 17, and the taking of hydraulic fluid out of the interior of the torque converter housing 5 from the second hydraulic fluid aperture 18.

On the other hand, when a flow of hydraulic fluid is supplied into the interior of the torque converter housing 5 in through the second hydraulic fluid aperture 18, and is taken out of the interior of the torque converter housing 5 from the first hydraulic fluid aperture 17, this flow of hydraulic fluid again of course serving to fill the inside of the torque converter housing 5 with hydraulic fluid as is required for its operation, then the excess of the fluid pressure on the right side in the FIGURE of the clutch disk 13 over the fluid pressure on the left side thereof, due to the rather restricted size of the space available for passage of hydraulic fluid past the lining 15, between said lining 15, and the end wall 14 of the torque converter housing 5, ensures that the clutch disk 13 as a whole is biased to the left in the FIGURE, and is pressed tightly against the end wall 14 of the torque converter housing 5, via the lining 15. In this operational state, the clutch disk 13 and the torque converter housing 5 are mechanically rotationally coupled together, and accordingly the pump impeller 6 and the turbine member 7 of the torque converter 9 are mechanically coupled together with regard to their rotation, and their rotational coupling together by the circulation of hydraulic fluid within the torque converter 9, according to the normal per se well known functioning of the torque converter 9, ceases to be of any importance. In this condition, the circulation of hydraulic fluid within the torque converter 9 soon ceases, and the body of fluid within the housing 5 of the torque converter 9, the housing 5, the pump impeller 6, the turbine member 7, and the stator 8 rotate together as one unit, at substantially the same rotational speed. In other words, the lock up clutch assembly 16 is engaged, by the supply of hydraulic fluid into the interior of the torque converter housing 5 in through the second hydraulic fliid aperture 18, and the taking of hydraulic fluid out of the interior of the torque converter housing 5 from the first hydraulic fluid aperture 17.

This mode of engaging and disengaging the lock up clutch assembly 16 is per se well known in the art. However, as explained above, a problem is liable to arise with regard to the adequacy of the supply of the flow of hydraulic fluid for disengaging the lock up clutch assembly 16, when the internal combustion engine of the vehicle incorporating the transmission is idling, or is operating at very low engine rotational speed. In detail, when the lock up clutch assembly 16 is to be engaged, i.e. when a flow of hydraulic fluid is being supplied into the interior of the torque converter housing 5 in through the second hydraulic fluid aperture 18, and is being taken out of the interior of the torque converter housing 5 from the first hydraulic fluid aperture 17, then typically the vehicle incorporating this transmission is operating at fairly high engine rotational speed, and accordingly no problem of inadequacy of the magnitude of the flow of hydraulic fluid available for the torque converter 9 is likely to arise, because the hydraulic fluid pump of the transmission is likewise rotating at fairly high rotational speed. On the other hand, when the lock up clutch assembly 16 is to be disengaged, i.e. when a flow of hydraulic fluid is being supplied into the interior of the torque converter housing 5 in through the first hydraulic fluid aperture 17, and is being taken out of the interior of the torque converter housing 5 from the second hydraulic fluid aperture 18, then it is often the case that the internal combustion engine of the vehicle incorporating this transmission is being operated at quite low engine rotational speed or at idling speed, and in this case the flow of hydraulic fluid provided by the hydraulic fluid pump of the transmission is liable to be insufficient for properly disengaging the lock up clutch assembly 16, i.e. for properly biasing the clutch disk 13 to the right in the FIGURE away from the end wall 14 of the torque converter housing 5, and this can cause problems with regard to the disengagement of the lock up clutch assembly 16, such as drag, chattering, and the like, which can lead to poor drivability of the vehicle incorporating this transmission, as well as to early failure of the lock up clutch assembly 16.

The gear transmission mechanism 3 is only shown as a schematic block in the drawing, because many versions thereof are already well known and conventional. This gear transmission mechanism 3 has a power input shaft 19 which is rotationally connected to the power output shaft 10 of the torque converter assembly 2, and also has a power output shaft 20. The gear transmission mechanism 3 incorporates several hydraulic fluid pressure activated friction engagement mechanisms such as multi plate clutches and multi plate brakes, one of which is exemplarily and schematically shown by a block denoted by the reference numeral 21 in the drawing, and, according to selective supply of one or another particular combination of activating hydraulic fluid pressures from a hydraulic fluid pressure control circuit 22 which will be described later to various combinations of these friction engagement mechanisms such as the friction engagement mechanism 21 via conduits such as the hydraulic fluid conduit 23, in a per se well known way the gear transmission mechanism 3 is controlled to provide one or another of a plurality of different transmission ratios between its power input shaft 19 and its power output shaft 20. The exemplarily shown hydraulic fluid pressure activated friction engagement mechanism 21 is selectively supplied with activating hydraulic fluid pressure, or alternatively is relieved of said supply of hydraulic fluid pressure, via the hydraulic fluid conduit 23. Further, the gear transmission mechanism 3 is provided with a lubricating circuit 58, schematically shown by a single block in the drawing, and during operation of this gear transmission mechanism 3 it is essential that a constant and sufficient supply of lubricating fluid, i.e. a supply of the same hydraulic fluid which is used for hydraulic pressure control purposes, should be supplied to this lubricating circuit 58, in order to lubricate the various moving parts of the gear transmission mechanism 3 such as the gears and the bearings therein. If such supply of lubricating hydraulic fluid should become insufficient, during operation of the gear transmission mechanism 3, then there is a great risk of complete and destructive failure of the gear transmission mechanism 3.

As has been described above, when the internal combustion engine of the vehicle incorporating the gear transmission mechanism 3 is operating at a low rotational speed then in general the moving parts of the gear transmission mechanism 3 are also operating at low rotational speeds and under low force loadings, and hence these moving parts do not require supply of a particularly large amount of lubricating hydraulic fluid. Thus, in these circumstances, no particularly large supply of hydraulic fluid needs to be made to the lubricating circuit 58; but it is absolutely essential that some small supply should be made. On the other hand, when the internal combustion engine of the vehicle incorporating the gear transmission mechanism 3 is operating at a medium or high rotational speed then in general the moving parts of the gear transmission mechanism 3 are also operating at medium or high low rotational speeds and under medium or high force loadings, and hence these moving parts at this time require supply of quite a large amount of lubricating hydraulic fluid. Thus, in these circumstances, a reasonably ample supply of hydraulic fluid needs to be made to the lubricating circuit 58.

The above mentioned hydraulic fluid pressure control circuit 22 is only shown by a block in the drawing, because such hydraulic fluid pressure control circuits are already per se well known in various different forms. This hydraulic fluid pressure control circuit 22 receives supply of pressurized hydraulic fluid, which is picked up from a hydraulic fluid reservoir 24 and is pressurized by a hydraulic fluid pump 25, via a line pressure control valve 26 which controls the pressure of this fluid to a controlled line hydraulic fluid pressure Pl as will be explained later. Further, the hydraulic fluid pressure control circuit 22 also receives supply of hydraulic fluid pressurized by the same hydraulic fluid pump 25, via a torque converter pressure control valve 27, which controls the pressure of this fluid to a controlled torque converter hydraulic fluid pressure Pq, as will also be explained later. The hydraulic fluid pressure control circuit 22 also controls the standard value Pl of the line hydraulic fluid pressure and the standard value Pq of the torque converter hydraulic fluid pressure, according to various different operational considerations, as will also be explained later. Further, the hydraulic fluid pressure control circuit 22 selectively supplies a supply of the line hydraulic fluid pressure Pl to the various friction engaging mechanisms of the gear transmission mechanism 3, such as the exemplarily shown friction engaging mechanism 21, via hydraulic fluid conduits such as the exemplarily shown hydraulic fluid conduit 23, according to various different operational conditions of the vehicle incorporating this transmission, as is per se well known in the art, and also selectively supplies a supply of the torque converter hydraulic fluid pressure Pq to the lock up clutch assembly 16, via the lock up clutch control valve 28, which will be explained in detail later. The hydraulic fluid pressure control circuit 22 comprises the following elements, which are only shown by blocks in the drawing because they are well known and conventional in the art in various forms: a manual range switching valve 29, a throttle hydraulic pressure control valve 30, a first and second speed switching valve 31, a second and third speed switching valve 32, a third and fourth speed switching valve 33, and a governor hydraulic fluid pressure control valve 34.

Now the line hydraulic fluid pressure control valve 26, which is per se well known, will be described.

This line hydraulic fluid pressure control valve 26 comprises a valve housing in which there is formed a bore, and a valve spool member 36 which is slidingly fitted into said bore so as to reciprocate in the upwards and downwards directions as seen in the drawing. Further, a compression coil spring 35 is provided below said valve spool member 36 in said bore, so as to bias said valve spool member 36 upwards as seen in the drawing, and so as to bear on a step in said bore; and, below said compression coil spring 35 in said bore, there is slidingly fitted a piston member 42, the upper end of which as seen in the drawing contacts the lower end of the valve spool member 36. From the hydraulic fluid pressure pump 25, via a hydraulic fluid conduit 37, a supply of pressurized hydraulic fluid is provided to a port 38 of the line hydraulic fluid pressure control valve 26, whence a part of this fluid is selectively released to a release port 40, so as to regulate the pressure present at the port 38 to a controlled value of line hydraulic fluid pressure Pl; and from this port 38, via a hydraulic fluid conduit 41, a supply of this line hydraulic fluid pressure Pl is provided to the hydraulic fluid pressure control circuit 22. From an intermediate point of this hydraulic fluid conduit 41 there branches off a hydraulic fluid conduit 81 which has a throttle element 82 provided at an intermediate part thereof and which leads to a feedback control port 39 of the line hydraulic fluid pressure control valve 26. The feedback control port 39 opens to a pressure chamber defined at the top as seen in the drawing of the valve bore of the line hydraulic fluid pressure control valve 26, and accordingly the line hydraulic fluid pressure Pl, when supplied as described above to the feedback control port 39, biases the valve spool member 36 in the downwards direction as seen in the drawing, against the action of the compression coil spring 35 and the pressure exerted by the piston 42, and thus according to the pumping action of the hydraulic fluid pressure pump 25 the line hydraulic fluid pressure Pl builds up until the valve spool member 36 is driven so far downwards in the FIGURE by the line hydraulic fluid pressure Pl supplied to the feedback control port 39, against the biasing actions of the compression coil spring 25 and of the piston 42 which are overcome, for some of the hydraulic fluid pressure present at the port 38 to be released to the release port 40 by passing a land 84 formed on the valve spool member 36. Thereby the pressure at the port 38 is regulated to a controlled hydraulic fluid pressure valve Pl, in a feedback manner, as is per se well known in the art, the value of Pl depending upon the total biasing force exerted upwards in the drawing on the valve spool member 36 by the compression coil spring 35 and by the piston 42.

The piston 42 is biased upwards in the drawing by the throttle hydraulic fluid pressure Pth, which is supplied via a hydraulic fluid conduit 43 from the throttle hydraulic fluid pressure control valve 30 to a port 44 which leads to a chamber defined within the valve bore of the line hydraulic fluid pressure control valve 26 at the bottom end of said valve bore as seen in the drawing, below the piston 42; and said piston 42 is also biased upwards as seen in the drawing by a reverse stage hydraulic fluid pressure Pr which is supplied from the hydraulic fluid pressure control circuit 22 to a port 46 which leads to a chamber within the valve bore of the line hydraulic fluid pressure control valve 26 defined between two lands of the piston 42 of which the upper land in the drawing is of larger pressure receiving area than the lower, said reverse stage hydraulic fluid pressure Pr being provided when the manual range selection valve 29 of the hydraulic fluid pressure control circuit 22 is switched to the "R" range so as to engage the reverse stage of the gear transmission mechanism 3. By this construction, the controlled value Pl of the line hydraulic fluid pressure produced at the port 38 of the line hydraulic fluid pressure control valve 26 is increased according to increase in the throttle hydraulic fluid pressure Pth, and is also increased when the gear transmission mechanism 3 is to be operated in the reverse stage, both of these concepts being known in the art.

The hydraulic fluid which is released to the release port 40 is returned, via a hydraulic fluid release conduit 85, to the inlet side of the hydraulic fluid pressure pump 25, and/or to the hydraulic fluid reservoir 24.

Now the torque converter hydraulic fluid pressure control valve 27, which is per se well known, will be described.

This torque converter hydraulic fluid pressure control valve 27 comprises a valve housing in which there is formed a bore, and a valve spool member 48 which is slidingly fitted into said bore so as to reciprocate in the upwards and downwards directions as seen in the drawing. Further, a compression coil spring 47 is provided below said valve spool member 48 in said bore, so as to bias said valve spool member 48 upwards as seen in the drawing, and so as to bear on a step in said bore; and, below said valve spool member 48 in said bore, as seen in the drawing, there is defined within said valve bore a pressure chamber to which a control port 55 communicates. From the hydraulic fluid pressure pump 25, via the hydraulic fluid conduit 37 and via a throttle element 49, a supply of pressurized hydraulic fluid is provided to a port 51 of the torque converter hydraulic fluid pressure control valve 27, whence a part of this fluid is selectively released to a release port 53, so as to regulate the pressure present at the port 51 to a controlled value of torque converter hydraulic fluid pressure Pq; and from this port 51, via a hydraulic fluid conduit 56, a supply of this torque converter hydraulic fluid pressure Pq is provided to the hydraulic fluid pressure control circuit 22. From an intermediate point of this hydraulic fluid conduit 56 there branches off a hydraulic fluid conduit 86 which has a throttle element 87 provided at an intermediate part thereof and which leads to a feedback control port 52 of the torque converter hydraulic fluid pressure control valve 27. The feedback control port 52 opens to a pressure chamber located at the top as seen in the drawing of the valve bore of the torque converter hydraulic fluid pressure control valve 27, and accordingly the torque converter hydraulic fluid pressure Pq, when supplied as described above to the feedback control port 52, biases the valve spool member 48 in the downwards direction as seen in the drawing, against the action of the compression coil spring 47 and the pressure exerted by the pressure in the chamber at the bottom of the valve bore, and thus according to the pumping action of the hydraulic fluid pressure pump 25 the torque converter hydraulic fluid pressure Pq builds up until the valve spool member 48 is driven so far downwards in the figure by the torque converter hydraulic fluid pressure Pq supplied to the feedback control port 52, aginst the biasing actions of the compression coil spring 25 and of the pressure in the aforesaid chamber which are overcome, for some of the hydraulic fluid pressure present at the port 51 to be released to the release port 53 by passing a land 88 formed on the valve spool member 48. Thereby the pressure at the port 51 is regulated to a controlled hydraulic fluid pressure value Pq, in a feedback manner, as is per se well known in the art, the value of Pq depending upon the total biasing force exerted upwards in the drawing on the valve spool member 48 by the compression coil spring 47 and by the pressure supplied to the port 55.

The throttle hydraulic fluid pressure Pth is supplied from the throttle hydraulic fluid pressure control valve 30 via a hydraulic fluid conduit 54 to the port 55 which leads to the aforesaid chamber within the valve bore of the torque converter hydraulic fluid pressure control valve 27 located below the valve spool member 48 thereof in the drawing. By this construction, the controlled hydraulic fluid pressure value Pq of the torque converter hydraulic fluid pressure produced at the port 51 of the torque converter hydraulic fluid pressure control valve 27 is increased according to increase in the throttle hydraulic fluid pressure Pth, this concept being known in the art.

Particularly according to the concept of the present invention, the hydraulic fluid which is released to the release port 53 of the torque converter hydraulic fluid pressure control valve 27 is supplied, via a hydraulic fluid conduit 57, to the lubricating circuit 58 of the gear transmission mechanism 3. Further, via a hydraulic fluid conduit 89 and a throttle element 59, a supply of the torque converter hydraulic fluid pressure Pq which is present at the port 51 of the torque converter hydraulic fluid pressure control valve 27 is also made to the lubricating circuit 58, in order to ensure provision of lubricating hydraulic fluid to the gear transmission mechanism 3, even when no hydraulic fluid is being released past the land 88 of the valve spool member 48 to the release port 53 of the torque converter hydraulic fluid pressure control valve 27.

Now the lock up clutch control valve 28, which is also per se well known, will be described.

This lock up clutch control valve 28 comprises a valve housing in which there is formed a bore, and a valve spool member 61 which is slidingly fitted into said bore, so as to reciprocate in the upwards and downwards directions as seen in the drawing. Below said valve spool member 61 in said bore, there is slidingly fitted a piston member 72, the upper end of which in the drawing contacts the lower end of the valve spool member 61. Further, a compression coil spring 60 is provided above said valve spool member 61 in said bore, so as to bias said valve spool member 61 downwards as seen in the drawing, and so as to bear on the top end of said bore. At the upper end of said bore as seen in the drawing, above said valve spool member 61, there is defined within said valve bore a first pressure chamber to which a control port 90 communicates; at an intermediate part of said bore, between said valve spool member 61 and said piston member 72, there is defined within said valve bore a second pressure chamber to which a control port 70 communicates; and at the lower end of said bore as seen in the drawing, below said piston member 72, there is defined within said valve bore a third pressure chamber to which a control port 71 communicates. The valve spool member 61 and the piston membe 72 can move either to downwardly biased positions within the valve bore, as seen to the left of the central axis of the bore of the lock up clutch control valve 28 in the drawing, or to upwardly biased positions within the valve bore, as seen to the right of the central axis of the valve bore in the drawing. When actuating hydraulic fluid pressure is supplied to the control port 71, then the valve spool member 61 and the piston member 72 are both driven upwards as seen on the right of the central axis of the valve bore in the drawing against the biasing action of the compression coil spring 60 which is overcome; when actuating hydraulic fluid pressure is supplied to the control port 70, then the valve spool member 61 is driven upwards as seen on the right of the drawing against the biasing action of the compression coil spring 60 which is overcome, while the piston member 72 is driven downwards as seen on the left of the drawing; and when no actuating hydraulic fluid pressure is supplied to either of these control ports 70 and 71, or when actuating hydraulic fluid pressure is supplied to one or the other or both of these control ports 70 and 71 and is also supplied to the control port 90, then with the aid of the biasing action of the compression coil spring 60 the valve spool member 61 and the piston member 72 are driven to their downwards positions as seen on the left of the axis of the valve bore in the drawing.

The lock up clutch control valve 28 is provided with six switched ports 63, 66, 67, 74, 62, and 73. When the valve spool member 61 is in its downwardly biased position within the valve bore as seen on the left of the central axis of the valve bore in the drawing, then the switching ports 73 and 74 are not connected to any other ports, while the ports 62 and 63 are communicated to one another, and the ports 66 and 67 are also communicated to one another. On the other hand, when the valve spool member 61 is in its upwardly biased position within the valve bore as seen on the right of the central axis of the valve bore in the drawing, then the switching ports 62 and 67 are not connected to any other ports, while the ports 63 and 74 are communicated to one another, and the ports 66 and 73 are also communicated to one another.

These switching ports of the lock up clutch control valve 28 are connected as follows. The control ports 70, 71, and 90 are connected, via hydraulic fluid conduits, to the hydraulic fluid pressure control circuit 22, for selectively receiving supplies of switching fluid pressures for switching the lock up control valve 28 between its two switched positions. The ports 62 and 73 are connected, via hydraulic fluid conduits, to the hydraulic fluid pressure control circuit 22 for selectively receiving supplies of the torque converter hydraulic fluid pressure Pq. The port 74 is connected, via a hydraulic fluid conduit, to the hydraulic fluid pressure control circuit 22, for selectively releasing hydraulic fluid from the torque converter assembly 2, as will be explained later. The port 63 is connected, via a hydraulic fluid conduit 64, to the first hydraulic fluid aperture 17, already mentioned, which leads to the inside of the torque converter housing 5. The port 66 is connected, via a hydraulic fluid conduit 65, to the second hydraulic fluid aperture 18, already mentioned, which also leads to the inside of the torque converter housing 5. And the port 67 is connected, via a hydraulic fluid conduit 69, to the input side of a hydraulic fluid cooler 68, the output side of which is drained to the hydraulic fluid reservoir 24.

As has been described above, when the internal combustion engine of the vehicle incorporating the gear transmission mechanism 3 is operating at a low rotational speed then in general not a great amount of heat is being generated within the torque converter 9 by the churning of hydraulic fluid within it, and thus no particular cooling effect is required from the hydraulic fluid cooler 68. Thus, in these circumstances, no flow of hydraulic fluid needs to be supplied through the hydraulic fluid cooler 68. On the other hand, when the internal combustion engine of the vehicle incorporating the gear transmission mechanism 3 is operating at a medium or high rotational speed then in general a quite large amount of heat is being generated within the torque converter 9 by the churning of hydraulic fluid within it, and thus a substantial cooling effect is required from the hydraulic fluid cooler 68. Thus, in these circumstances, a flow of hydraulic fluid is required to be supplied through the hydraulic fluid cooler 68.

The transmission described above operates as follows, with particular reference to the operation of the lock up clutch assembly 16, and to the lubrication of the gear transmission mechanism 3.

First, when the lock up clutch assembly 16 is to be activated to be in its locked up state operational condition, which is decided by the hydraulic fluid pressure control circuit 22, based upon the current values of various operational parameters of the vehicle incorporating the transmission according to the present invention, examples of these operational parameters being the vehicle road speed, the amount of depression of the accelerator pedal of the vehicle, the range manually set on the manual range setting valve 29, and so forth, then the hydraulic fluid pressure control circuit 22 sends an actuating hydraulic fluid pressure to the lock up clutch control valve 28, either to its control port 70 or to its control port 71 (it is immaterial which), and this pressure drives the valve spool member 61 of the lock up clutch control valve 28 upwards as seen in the drawing to its position as seen on the right of the central axis of the valve bore in the drawing. In this state, further, the hydraulic fluid pressure control circuit 22 switches a supply of the torque converter hydraulic fluid pressure Pq to supply it to the port 73 of the lock up clutch control valve 28, whence this pressure is transmitted to the port 66 thereof, whence it is transmitted, via the hydraulic fluid conduit 65, to the second hydraulic fluid aperture 18 of the torque converter housing 5. Hydraulic fluid therefore passes in through this second hydraulic fluid aperture 18 to the part of the space inside of the torque converter housing 5 to the right in the drawing of the lock up clutch disk 13, fills the inside of the torque converter housing 5 as is of course required, and tends to flow past the outer edge of the lock up clutch disk 13, between the lining 15 mounted on this outer edge and the end wall 14 of the torque converter housing 5, to the space inside the torque converter housing 5 to the left in the drawing of the lock up clutch disk 13, so as to be taken out through the first hydraulic fluid aperture 17 from the part of the space inside of the torque converter housing 5 to the left in the drawing of the lock up clutch disk 13 between the lock up clutch disk 13 and the end wall 14 of the torque converter housing 5. From this first hydraulic fluid aperture 17, said hydraulic fluid flow tends to pass through the conduit 64 to the port 63 of the lock up clutch control valve 28, whence it tends to be transmitted to the port 74 thereof, whence it tends to be drained to the hydraulic fluid reservoir 24 via the hydraulic fluid pressure control circuit 22.

This flow of hydraulic fluid, as explained above, causes a build up of fluid pressure on the right side in the figure of the clutch disk 13 over the fluid pressure on the left side thereof, due to the restriction of the space available for passage of hydraulic fluid between the lining 15 and the end wall 14 of the torque converter housing 5, and this pressure build up ensures that the clutch disk 13 as a whole is biased to the left in the figure, and is pressed tightly against the end wall 14 of the torque converter housing 5, via the lining 15, thus causing the clutch disk 13 and the torque converter housing 5 to be mechanically rotationally coupled together. Accordingly the pump impeller 6 and the turbine member 7 of the torque converter 9 are mechanically coupled together with regard to their rotation, and the lock up clutch assembly 16 is engaged, by the supply of hydraulic fluid into the interior of the torque converter housing 5 in through the second hydraulic fluid aperture 18. At this time, because the clutch disk 13 is tightly pressed against the end wall 14 of the torque converter housing 5 via the lining 15, in fact little or substantially no flow of hydraulic fluid actually passes in through the second hydraulic fluid aperture 18 into the inside of the torque converter housing 5, or out of the interior of the torque converter housing 5 from the first hydraulic fluid aperture 17; but of course some small leakage flow will always pass the seal thus formed by the lining 15 against the end wall 14, as a practical fact.

In this state, the port 67 of the lock up clutch control valve 28 is closed by the valve spool member 61, and hence no flow of hydraulic fluid is passed through the hydraulic fluid cooler 68. However, at this time, since the lock up clutch assembly 16 is engaged, the circulation of hydraulic fluid within the torque converter 9 has ceased, and the body of fluid within the housing 5 of the torque converter 9 is rotating as a unit together with the housing 5, the pump impeller 6, the turbine member 7, and the stator 8, all these being in rotation at substantially the same rotational speed, and accordingly very little heat is being generated within the torque converter 9 by the churning of hydraulic fluid therein, because little frictional loss is occurring in the torque converter assembly 2. Therefore, no particular cooling effect is necessary to be provided by the hydraulic fluid cooler 68 at this time.

In this operational condition, typically the crankshaft (not shown) of the internal combustion engine which is powering the power input shaft 4 of the transmission, and also the hydraulic fluid pressure pump 25, are rotating at a fairly high rotational speed, and in this condition the rate of delivery of pressurized hydraulic fluid from the pump 25 is quite high. Thus, a substantial amount of hydraulic fluid is constantly being released from the release port 53 of the torque converter hydraulic fluid pressure control valve 27, and this substantial amount of hydraulic fluid, along with the rather small amount of hydraulic fluid that is always being supplied from the port 51 of the torque converter hydraulic fluid pressure control valve 27 via the hydraulic fluid conduit 89 and the throttle element 59, is supplied to the lubricating circuit 58 of the gear transmission mechanism 3, thus supplying quite a large total amount of lubricating hydraulic fluid to the gear transmission mechanism 3 for lubricating the moving parts therein. This is proper, because in this fairly high engine rotational speed operational condition the gear transmission mechanism 3 in fact, as stated above, does typically require a fairly high amount of flow of lubricating hydraulic fluid.

On the other hand, when the lock up clutch assembly 16 is to be disengaged, which is, again, decided by the hydraulic fluid pressure control circuit 22, based upon the current values of various operational parameters of the vehicle incorporating the transmission according to the present invention, then the hydraulic fluid pressure control circuit 22 does not send any actuating hydraulic fluid pressure either to the control port 70 or to the control port 71 of the lock up clutch control valve 28, and accordingly under the biasing action of the compression coil spring 60, aided if necessary by actuating hydraulic fluid pressure which the hydraulic fluid pressure control circuit supplies to the control port 90, the valve spool member 61 of the lock up clutch control valve 28 is shifted downwards as seen in the drawing to its position as seen on the left of the central axis of the valve bore in the drawing. In this state, further, the hydraulic fluid pressure control circuit 22 switches a supply of the torque converter hydraulic fluid pressure Pq so as to supply said pressure Pq to the port 62 of the lock up clutch control valve 28, whence this pressure is transmitted to the port 63 thereof, whence it is transmitted, via the hydraulic fluid conduit 64, to the first hydraulic fluid aperture 17 of the torque converter housing 5. Hydraulic fluid therefore passes in through this first hydraulic fluid aperture 17 to the part of the space inside of the torque converter housing 5 to the left in the drawing of the lock up clutch disk 13, between the lock up clutch disk 13 and the end wall 14 of the torque converter housing 5, fills the inside of the torque converter housing 5 as is of course required, flows past the outer edge of the lock up clutch disk 13, between the lining 15 mounted on this outer edge and the end wall 14 of the torque converter housing 5, to the space inside the torque converter housing 5 to the right in the drawing of the lock up clutch disk 13, and is taken out from the second hydraulic fluid aperture 18 from the part of the space inside of the torque converter housing 5 to the right in the drawiing of the lock up clutch disk 13. From this first hydraulic fluid aperture 17, said fluid flow is passed through the conduit 65 to the port 66 of the lock up clutch control valve 28, whence it is communicated to the port 67 thereof, whence it is drained to the hydraulic fluid reservoir 24 via the hydraulic fluid conduit 69 and the hydraulic fluid cooler 68.

This flow of hydraulic fluid, as explained above, causes an excess of fluid pressure on the left side in the figure of the clutch disk 13 over the fluid pressure on the right side thereof, due to the rather restricted size of the space available for passage of hydraulic fluid past the lining 15, between said lining 15 and the end wall 14 of the torque converter housing 5, and this pressure difference ensures that the clutch disk 13 as a whole is biased to the right in the figure, and is pressed away from the end wall 14 of the torque converter housing 5, and does not engage said end wall 14 via the lining 15, thus causing the clutch disk 13 and the torque converter housing 5 not to be mechanically rotationally coupled together. Accordingly the pump impeller 6 and the turbine member 7 of the torque converter 9 are not mechanically coupled together with regard to their rotation, but are only rotationally coupled together via the circulation of hydraulic fluid within the torque converter 9, i.e. are only rotationally coupled together in a torque converting fashion, according to the normal per se well known functioning of the torque converter 9. In other words, the lock up clutch assembly 16 is disengaged, by the supply of hydraulic fluid into the interior of the torque converter housing 5 in through the first hydraulic fluid aperture 17, and the taking of hydraulic fluid out of the interior of the torque converter housing 5 from the second hydraulic fluid aperture 18.

In this state, the port 67 of the lock up clutch control valve 28 (as well as the port 62 thereof) is communicated to the port 66, and flow of hydraulic fluid from the inside of the torque converter assembly 2 is passed through the hydraulic fluid cooler 68. At this time, since the lock up clutch assembly 16 is disengaged, the circulation of hydraulic fluid within the torque converter 9 is operating to couple together the pump impeller 6 and the turbine member 7, as explained above, and accordingly the body of hydraulic fluid within the housing 5 of the torque converter 9 is being substantially churned by the pump impeller 6, the turbine member 7, and the stator 8, all these being in rotation at somewhat different rotational speeds, and accordingly considerable heat is being generated within the torque converter 9 by this churning of hydraulic fluid therein, because considerable frictional loss is occuring in the torque converter assembly 2, the actual amount of heat being generated of course being related to the actual rotational speed of the power input shaft 4 and the actual rotational speed of the power output shaft 10 of the torque converter assembly 2, as well as to the load being transmitted. Therefore, a considerable cooling effect may well be necessary from the hydraulic fluid cooler 68 at this time.

In this operational condition, wherein the direct clutch assembly 16 is not engaged, quite often the crankshaft (not shown) of the internal combustion engine which is powering the power input shaft 4 of the transmission, and therefore also the hydraulic fluid pressure pump 25, is rotating at a fairly low rotational speed, and in this operational condition the rate of delivery of pressurized hydraulic fluid from the pump 25 is not very high. Thus, at this time, not very much or no hydraulic fluid may be being released from the release port 53 of the torque converter hydraulic fluid pressure control valve 27, and thus little or no hydraulic fluid may be being supplied from this source to the lubricating circuit 58 of the gear transmission mechanism 3. On the other hand, the rather small amount of hydraulic fluid that is always being supplied from the port 51 of the torque converter hydraulic fluid pressure control valve 27 via the hydraulic fluid conduit 89 and the throttle element 59 is still being supplied to the gear transmission mechanism 3 for lubricating the moving parts therein. This, as explained above, will be adequate, because in this fairly low engine rotational speed operational condition the gear transmission mechanism 3 in fact does typically not require a very high amount of flow of lubricating hydraulic fluid.

The essence of the present invention does not relate to the construction of any of the individual parts of the automatic transmission described here, because, as explained above, the torque converter assembly 2, the gear transmission mechanism 3, the hydraulic fluid pressure control circuit 22, the line hydraulic fluid pressure control valve 26, the torque converter hydraulic fluid pressure control valve 27, the lock up clutch control valve 28, and the hydraulic fluid cooler 68 are all of them of constructions which are per se well known in the art and conventional. The essential concept of the present invention is in the system of connection of these parts, which makes economical use of the overspill hydraulic fluid which is discharged from the release port 53 of the torque converter hydraulic fluid pressure control valve 27, and which also provides flow of hydraulic fluid through the hydraulic fluid cooler 68 only when the one way clutch assembly 16 is disengaged. This concept is effective, as explained above, for ensuring good disengagement of the lock up clutch assembly 16, during operation of the internal combustion engine of the vehicle incorporating this transmission at low enging revolution speed, and hence promotes good durability of the lock up clutch assembly 16, as well as good drivability of the vehicle.

Although the present invention has been shown and described with reference to a preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawing, but solely by the scope of the appended claims, which follow.

What is claimed is:

1. An automatic transmission for an automotive vehicle, comprising:
   (a) a gear transmission mechanism which comprises a lubricating system and which can provide a plurality of speed stages according to a selective supply of actuating hydraulic fluid pressure thereto;
   (b) a hydraulic fluid pump which provides a supply of pressurized hydraulic fluid;
   (c) a torque converter, which has two ports, the interior of which is filled with hydraulic fluid supplied from a selected one of said two ports, and which incorporates a lock up clutch which is selectively engaged or disengaged according to changing over of supply of hydraulic fluid pressure thereto between said two ports;
   (d) a hydraulic fluid pressure control system which controls said gear transmission mechanism so as, according to operational parameters of said vehicle, to set said gear transmission mechanism to one or another of said plurality of speed stages;
   (e) a line hydraulic fluid pressure control valve which receives a supply of pressurized hydraulic fluid from said hydraulic fluid from said hydraulic fluid pump and which provides a supply thereof, regulated to a line hydraulic fluid pressure level, to said hydraulic fluid pressure control system as a source of line pressure;
   (f) a first throttle element;
   (g) a torque converter hydraulic fluid pressure control valve which:
   (g1) receives a supply of pressurized hydraulic fluid from said hydraulic fluid pump in parallel to said line hydraulic fluid pressure control valve via said first throttle element; and
   (g2) provides a supply thereof to said torque converter as a source of torque converter hydraulic fluid pressure for filling the interior of said torque converter with hydraulic fluid and for selectively either engaging or disengaging said lock up clutch, said supply of torque converter hydraulic fluid pressure being regulated to a torque converter hydraulic fluid pressure level by said torque converter hydraulic fluid pressure control valve performing the action of, when said supply thereto of hydraulic fluid from said hydraulic fluid pump is pentiful, diverting therefrom a release flow of hydraulic fluid; and
   (h) a second throttle element;
   (i) said release flow of hydraulic fluid, when available, being supplied to said lubricating system of said gear transmission mechanism, and also said torque converter hydraulic fluid pressure being supplied to said lubricating system of said gear transmission mechanism via said second throttle element;
   (j) whereby said torque converter hydraulic fluid pressure is always maintained at a level proportionally reduced as compared with said line hydraulic fluid pressure level, and, when said hydraulic fluid pump is producing a plentiful amount of flow of hydraulic fluid, and said torque converter hydraulic fluid pressure control valve is thus releasing a fairly large release flow of hydraulic fluid as diverted from said plentiful supply of hydraulic fluid from said pump, said lubricating system of said gear transmission mechanism is thus receiving an ample flow of lubricating hydraulic fluid, this ample flow being made up both of said release flow of hydraulic fluid, and also of said flow of hydraulic fluid from said torque converter hydraulic fluid pressure as provided through said second throttle element; but, when said hydraulic fluid pump is producing rather a small flow of hydraulic fluid, and said torque converter hydraulic fluid pressure control valve is not releasing any substantial release flow of hydraulic fluid as diverted from said supply of hydraulic fluid from said pump, said lubricating system of said gear transmission mechanism is still receiving a certain definite small amount of lubricating hydraulic fluid, from said torque converter hydraulic fluid pressure as provided via said second throttle element.

2. A transmission according to claim 1, further comprising a hydraulic fluid cooler provided in a flow passage of hydraulic fluid which is being discharged from one of said two ports when said lock up clutch is disengaged, whereby this hydraulic fluid, which has been warmed by churning within said torque converter as said torque converter performs its torque conversion function, is cooled.

* * * * *